United States Patent [19]

DeMartino

[11] Patent Number: 4,851,502
[45] Date of Patent: Jul. 25, 1989

[54] SIDE CHAIN LIQUID CRYSTALLINE CONDENSATION POLYMERS EXHIBITING NONLINEAR OPTICAL RESPONSE

[75] Inventor: Ronald N. DeMartino, Wayne, N.J.

[73] Assignee: Hoechst Celanese Corporation, Somerville, N.J.

[21] Appl. No.: 103,294

[22] Filed: Oct. 1, 1987

Related U.S. Application Data

[60] Division of Ser. No. 898,982, Aug. 22, 1986, Pat. No. 4,795,664, which is a continuation-in-part of Ser. No. 822,090, Jan. 24, 1986.

[51] Int. Cl.$^4$ .................. C08G 63/44; C08G 63/68
[52] U.S. Cl. ........................... 528/176; 252/299.01; 528/288; 528/291; 528/294; 528/373
[58] Field of Search ............... 528/176, 192, 288, 291, 528/294, 373; 428/1; 252/299.01, 299.1

[56] References Cited

U.S. PATENT DOCUMENTS

| | | | |
|---|---|---|---|
| 4,293,435 | 10/1981 | Portugall et al. | 428/1 |
| 4,657,694 | 4/1987 | Heeger et al. | 252/299.01 |
| 4,713,196 | 12/1987 | Praefcke et al. | 428/1 |

OTHER PUBLICATIONS

Macromolecules, vol. 15, No. 5, Sep. Oct. 1982, "Optical & Nonlinear Optical Characterization of Molecularly Doped Thermotropic Liquid Crystalline Polymers", Meredith, G. R., et al., pp. 1386–1389.

*Primary Examiner*—Theodore Morris
*Attorney, Agent, or Firm*—DePaoli & O'Brien

[57] ABSTRACT

This invention provides novel side chain liquid crystalline polymers with a polyester or polyamide main chain structure. An invention polymer exhibits nonlinear optical response, and has utility as a transparent nonlinear optical component in optical light switch and light modulator devices.

A present invention side chain liquid crystalline polymer is illustrated by the following polyester structure with pendant mesogenic side chains:

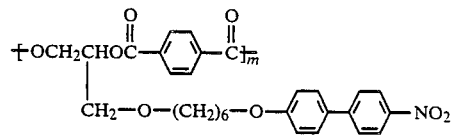

19 Claims, No Drawings

SIDE CHAIN LIQUID CRYSTALLINE CONDENSATION POLYMERS EXHIBITING NONLINEAR OPTICAL RESPONSE

This invention was made with Government support under Contract Number F33615-85-5025 awarded by the Department of Defense. The Federal Government has certain rights in this invention.

This is a division of application Ser. No. 898,982 filed Aug. 22, 1986, now U.S. Pat. No. 4,795,664, which is a continuation-in-part of patent application Ser. No. 822,090, filed Jan. 24, 1986.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above recited publications are incorporated herein by reference.

Of more specific interest with respect to the present invention embodiments is prior art relating to side chain liquid crystalline polymers, such as the five articles published on pages 275–368 of "Polymeric Liquid Crystals", edited by A. Blumstein (Plenum Publishing Corporation, New York, 1985).

U.S. Pat. No. 4,293,435 describes liquid crystalline polymers corresponding to the formula:

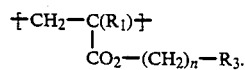

where $R_1$ is hydrogen or methyl, n is an integer from 1 to 6, and $R_3$ represents a structural element containing at least two phenylene groups.

Makromol, 179, 2541 (1978) by H. Finkelmann et al describes a model consideration for liquid crystalline polymers with biphenyl groups as mesogenic entities.

J. Polym. Sci., 19, 1427 (1981) by Paleos et al describes the synthesis of liquid crystalline polymers which are prepared by the interaction of poly(acryloyl chloride) with mesogenic compounds such as p-aminobiphenyl.

Eur. Polym. J., 18, 651 (1982) describes comb-like liquid crystalline polymers of the smectic and nematic types with cyanobiphenyl groups in the side chain:

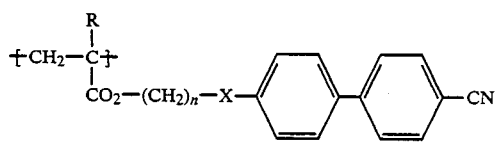

where R is hydrogen or methyl, n is an integer of 2–11, and X is an oxy, alkylene or carbonyloxy divalent radical.

Other publications which describe thermotropic liquid crystalline polymers with side chain induced crystallinity include Polymer, 25, 1342 (1984); Eur. Polym. J., 21, No. 7, 645 (1985); Polymer, 26, 615 (1985); and references cited therein.

The above listed publications are incorporated herein by reference.

There is continuing interest in the theory and practice of liquid crystalline polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide novel condensation polymers.

It is another object of this invention to provide thermotropic liquid crystalline condensation polymers having mesogenic side chains which exhibit nonlinear optical response.

It is a further object of this invention to provide optical light switch and light modulator devices with a transparent polymeric nonlinear optical component comprising a thermotropic side chain liquid crystalline condensation polymer.

Other objects and advantages of the present invention shall become apparent from the accompanying description and examples.

The present patent application has subject matter related to the disclosures of copending patent application Ser. Nos. 822,092; 822,093; and 822,094; filed Jan. 24, 1986, respectively.

DESCRIPTION OF THE INVENTION

One or more objects of the present invention are accomplished by the provision of a thermotropic liquid crystalline polymer which is characterized by a recurring monomeric unit corresponding to the formula:

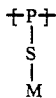

where P is a condensation polymer main chain unit, S is a flexible spacer group having a linear chain length of between about 0-20 atoms, M is a pendant mesogen which exhibits a second order nonlinear optical susceptibility $\beta$ of at least about $5 \times 10^{-30}$ esu as measured at 1.91 μm excitation wavelength, and where the pendant mesogens comprise at least about 10 weight percent of the polymer, and the polymer has a glass transition temperature above about 40° C.

In another embodiment this invention provides a thermotropic liquid crystalline polymer which is characterized by a recurring monomeric unit corresponding to the formula:

where P is a condensation polymer main chain unit, S is a flexible spacer group having a linear chain length of between about 0-20 atoms, M' is a pendant mesogen which exhibits a third order nonlinear optical susceptibility $\gamma$ of at least about $5 \times 10^{-36}$ esu as measured at 1.91 μm excitation wavelength, and where the pendant mesogens comprise at least about 10 weight percent of the polymer, and the polymer has a glass transition temperature above about 40° C.

In another embodiment this invention provides a polymer which is characterized by a recurring monomeric unit corresponding to the formula:

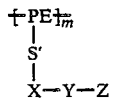

where PE is a main chain polyester condensation unit; m is an integer of at least 3; S' is a flexible spacer group having a linear chain length of between about 1-25 atoms; X is —NR—, —O— or —S—; R is hydrogen or a $C_1$-$C_4$ alkyl group; Y is

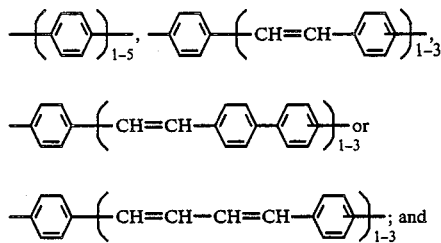

Z is an electron-donating group or an electron-withdrawing group.

In another embodiment this invention provides a polymer which is characterized by a recurring monomeric unit corresponding to the formula:

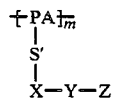

where PA is a main chain polyamide condensation unit; m is an integer of at least 3; S' is a flexible spacer group having a linear chain length of between about 1-25 atoms; X is —NR—, —O— or —S—; R is hydrogen or a $C_1$-$C_4$ alkyl group; Y is

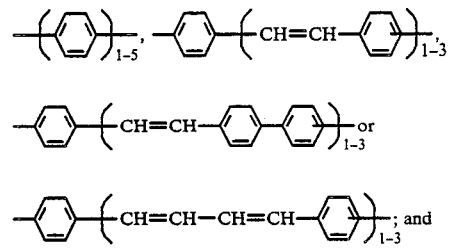

Z is an electron-donating group or an electron-withdrawing group.

In another embodiment this invention provides an optical light switch or light modulator device with a polymeric nonlinear optical component comprising a transparent solid medium of a thermotropic liquid crystalline polymer which is characterized by a recurring monomeric unit corresponding to the formula:

where P is a condensation polymer main chain unit, S is a flexible spacer group having a linear chain length of between about 0-20 atoms, M is a pendant mesogen which exhibits a second order nonlinear optical susceptibility $\beta$ of at least about $5 \times 10^{-30}$ esu as measured at 1.91 m excitation wavelength, and where the pendant mesogens comprise at least about 10 weight percent of the polymer, and the polymer has a glass transition temperature above about 40° C.

In a further embodiment this invention provides an optical light switch or light modulator device with a polymeric nonlinear optical component comprising a transparent solid medium of a thermotropic liquid crystalline polymer which is characterized by a recurring monomeric unit corresponding to the formula:

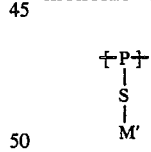

where P is a condensation polymer main chain unit, S is a flexible spacer group having a linear chain length of between about 0-20 atoms, M' is a pendant mesogen which exhibits a third order nonlinear optical susceptibility $\gamma$ of at least about $5 \times 10^{-36}$ esu as measured at 1.91 μm excitation wavelength, and where the pendant mesogens comprise at least about 10 weight percent of the polymer, and the polymer has a glass transition temperature above about 40° C.

An invention light switch or light modulator device typically will have a transparent solid medium of a thermotropic liquid crystalline polymer which has a stable orientation of an external field-induced alignment of mesogens.

The term "thermotropic polymer" as employed herein refers to a polymer which is liquid crystalline (i.e., anisotropic) in the melt phase.

The term "condensation polymer" as employed herein refers to a polyester or polyamide type polymer which generally is produced by covalent bond formation between reactants with the release of water or hydrohalide byproduct.

The term "transparent" as employed herein refers to an optical medium which is transparent or light transmitting with respect to incident fundamental light frequencies and created light frequencies. In a nonlinear optical device, a present invention nonlinear optical medium is transparent to both the incident and exit light frequencies.

The term "electron-donating" as employed herein refers to organic substituents which contribute π-electrons when the conjugated electronic structure is polarized by the input of electromagnetic energy.

The term "electron-withdrawing" as employed therein refers to electronegative organic substituents which attract π-electrons when the conjugated electronic structure is polarized by the input of electromagnetic energy.

Illustrative of electron-donating Z groups are amino, alkyl, alkoxy, alkylthio, hydroxy, thiolo, acyloxy, vinyl, halo, and the like.

Illustrative of electron-withdrawing substituents as represented by Z in the above formula are nitro, haloalkyl, cyano, acyl, alkanoyloxy, alkoxysulfonyl, and the like.

SYNTHESIS OF LIQUID CRYSTALLINE POLYMERS

The preparation of a polyester liquid crystalline polymer with mesogenic side chains is illustrated by the following flow diagram:

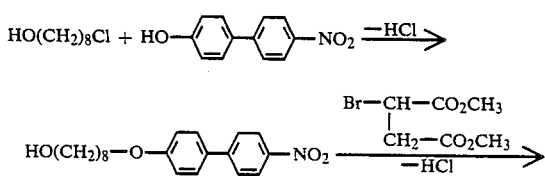

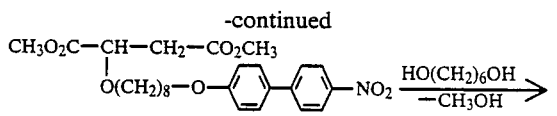

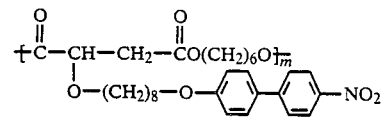

The preparation of a polyamide liquid crystalline polymer with mesogenic side chains is illustrated by the following flow diagram:

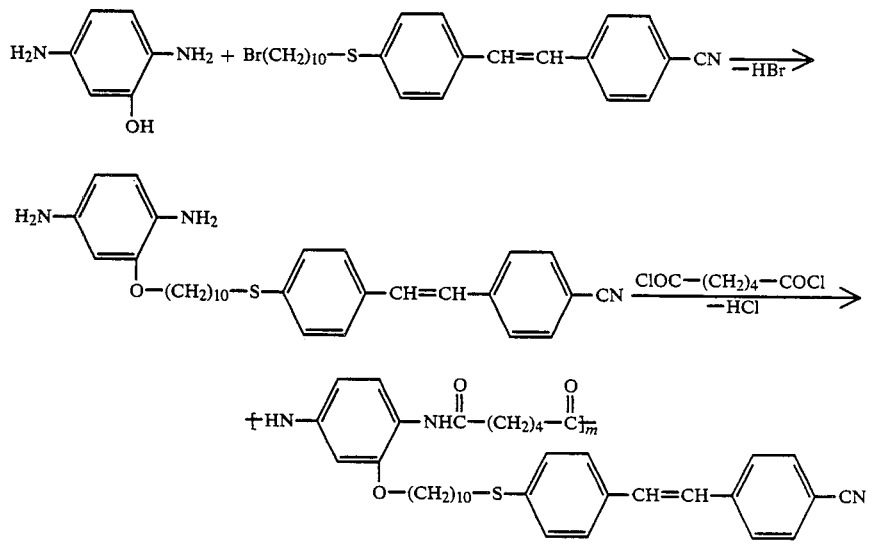

The types of reactants which can be employed in the illustrated synthesis are exemplified by the following general formulae:

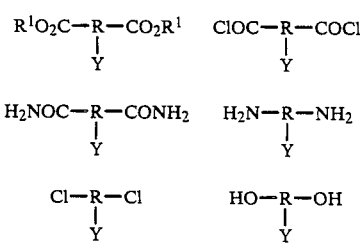

In the above illustrated formulae, R is selected from aliphatic, alicyclic and aromatic structures containing between about 1–20 carbon atoms, $R^1$ is hydrogen or an alkyl group, and Y is either hydrogen or a mesogenic side chain of the type previously described.

A present invention side chain liquid crystalline condensation polymer typically has a weight average molecular weight between about 2000–200,000, and preferably has a glass transition temperature ($T_g$) in the range between about 40° C.–120° C.

NONLINEAR OPTICAL PROPERTIES

The fundamental concepts of nonlinear optics and thier relationship to chemical structures can be expressed in terms of dipolar approximation with respect to the polarization induced in an atom or molecule by an an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a liquid crystalline domain:

$$\Delta\mu = \mu_e - \mu_g = \alpha E + \beta EE + \gamma EEE + \quad (1)$$

$$P = P_0 + \chi^{(1)}E + \chi^{(2)}EE + \chi^{(3)}EEE + \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave. Birefringent crystals often possess propagation directions in which the refractive index for the fundamental $\omega$ and the second harmonic $2\omega$ are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the natural dispersion, i.e., the optical transmission of fundamental and second harmonic frequencies is phase matched in the medium. The phase matching can provide a high conversion percentage of the incident light to the second harmonic wave.

For the general case of parametric wave mixing, the phase matching condition is expressed by the relationship:

$$n_1\omega_1 + n_2\omega_2 = n_3\omega_3$$

where $n_1$ and $n_2$ are the indexes of refraction for the incident fundamental radiation, $n_3$ is the index of refraction for the created radiation, $\omega_1$ and $\omega_2$ are the frequencies of the incident fundamental radiation and $\omega_3$ is the frequency of the created radiation. More particularly, for second harmonic generation, wherein $\omega_1$ and $\omega_2$ are the same frequency $\omega$, and $\omega_3$ is the created second harmonic frequency, $2\omega$, the phase matching condition is expressed by the relationship:

$$n_\omega = n_{2\omega}$$

where $n_\omega$ and $n_\omega$ are indexes of refraction for the incident fundamental and created second harmonic light waves, respectively. More detailed theoretical aspects are described in "Quantum Electronics" by A. Yariv, chapters 16-17 (Wiley and Sons, New York, 1975).

A present invention liquid crystalline polymer substrate typically is optically transparent and exhibits hyperpolarization tensor properties such as second harmonic and third harmonic generation, and the linear electrooptic (Pockels) effect. For second harmonic generation, the bulk phase of the liquid crystalline polymer substrate whether liquid or solid does not possess a real or orientational average inversion center. The substrate is a macroscopic noncentrosymmetric structure.

Harmonic generation measurements relative to quartz can be performed to establish the value of second order and third order nonlinear susceptibility of the optically clear substrates.

In the case of macroscopic nonlinear optical substrates that are composed of noncentrosymmetric sites on the molecular and domain level, the macroscopic second order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{ijk}(-\omega_3; \omega_1, \omega_2) = Nf^{\omega 3}f^{\omega 2}f^{\omega 1} <\beta_{ijk}(-\omega_3; \omega_1, \omega_2)>$$

wherein N is the number of sites per unit volume, f represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporated by reference.

Parent patent application Ser. No. 822,090, filed Jan. 24, 1986, is incorporated in its entirety herein by reference.

EXTERNAL FIELD INDUCED LIQUID CRYSTAL ORIENTATION

The term "external field" as employed herein refers to an electric, magnetic or mechanical stress field which is applied to a substrate of mobile organic molecules, to induce dipolar alignment of the molecules parallel to the field.

Liquid crystals (including polymeric liquid crystals) may be aligned by the application of an external field to a matrix of liquid crystal molecules. The degree of orientation is determined by the orientational order parameter. For both nematic and smectic mesophases, the parameter is defined in terms of a director which is a vector parallel to the molecular long axis (and perpendicular to the plane of molecular layering in the case of the smectic mesophase).

If theta is defined as the angle between the director and a chosen axis, then the orientational order parameter is defined as the average over all molecules of the second Legendre polynomial. The parameter ranges from −0.5 to 1.0 (1.0 corresponds to perfect uniaxial alignment along a given axis. 0.0 corresponds to random orientation, and −0.5 corresponds to random orientation confined in a plane perpendicular to a given axis).

The order parameter thus defined does not distinguish between parallel and antiparallel alignment. Thus, a sample of asymmetric rod-like molecules would have an order parameter of 1.0 for both the case in which the molecules are colinear and all pointed in the same direction, and the case in which the molecules are colinear and form antiparallel pairs.

The application of an orienting external field to an array of nematic liquid crystal molecules results in an order parameter of approximately 0.65. Deviations from ideal order are due to nematic fluctuations on a micron length scale which accommodate characteristic defects. These fluctuations may be dynamic for small molecule liquid crystals or frozen for polymeric liquid crystals. In either case, nematic fluctuations scatter light so that aligned samples appear to be hazy (particularly in a thick sample).

Smectic liquid crystals may be aligned by application of an orienting external field, with a resulting order parameter exceeding 0.9. Unlike the nematic phase, characteristic defects are removed upon aligning the smectic phase and thereby forming a single liquid crystal phase. Such phases are known as monodomains and, because there are no defects, are optically clear.

For both the nematic and smectic mesophases, application of a DC electric field produces orientation by torque due to the interaction of the applied electric field and the net molecular dipole moment. The molecular dipole moment is due to both the permanent dipole moment (i.e., the separation of fixed positive and negative charge) and the induced dipole moment (i.e., the separation of positive and negative charge by the applied field).

The torque which results by the application of a DC electric field normally would only produce very slight alignment even for high dipolar and polarizable molecules at room temperature. The alignment torque is negligible in comparison with the disordering effect of thermally induced rotation (i.e., the Boltzman distribution of rotational eigenstates at room temperature). However, due to the unique associations developed by liquid crystalline molecules through intermolecular forces, long range orientational order on a micron length scale is present. Under these conditions, bulk orientation of the sample by application of aligning fields exceeding a few volts/cm can produce the degrees of alignment indicated above.

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed for the nematic phase. At these frequencies, rotational motion of aligned nematic regions is not sufficient to follow the field. As a direct result, torque due to the interaction of the applied field and any permanent dipole moment over time averages to zero. However, electronically induced polarization is a very rapid process so that the induced dipole moment changes direction depending upon the direction of the applied field resulting in a net torque.

Application of a magnetic field also can effect alignment. Organic molecules do not possess a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment for a nematic phase.

Alignment of nematics by electric or magnetic fields are accomplished simply by application of the field to the nematic material. Alignment of the smectic phase is more difficult due to a higher viscosity which decreases rotational freedom. Formation of aligned smectic monodomains can be achieved by orienting a material in the nematic phase, and cooling the material into the smectic phase while maintaining the aligning field. For materials which have only smectic and isotropic phases and which lack a nematic phase, alignment can be accomplished in the smectic phase at an elevated temperature near the smectic to isotropic transition temperature, e.g., sufficiently close to the transition temperature so that the medium may contain smectic domains in an isotropic fluid.

Mechanical stress induced alignment is applicable to both the smectic and nematic mesophases. Strong aligning mechanical stress propagates throughout a solid liquid crystalline material due to the natural tendency of these media to self align. Specific mechanical stress methods include stretching a thin film, or coating a liquid crystalline surface with an aligning polymer such as nylon. Physical methods (e.g., stretching) rely upon the rigid and geometrically asymmetric character of certain liquid crystalline molecules to induce bulk orientation. Chemical methods (e.g., coating the surface with an aligning polymer) rely upon strong intermolecular interactions to induce surface orientation. All of the methods described above to produce oriented materials apply to both small molecule liquid crystals and polymeric liquid crystals. For polymers which possess a glass transition, the aligned liquid crystalline phase can be frozen by rapid cooling below the glass transition temperature.

Publications relating to external field-induced liquid crystal molecular orientation include The Physics of Liquid Crystals, P. G. deGennes, p. 95–97, Oxford University Press, 1974; J. Stamatoff et al, "X-Ray Diffraction Intensities of a Smectic-A Liquid Crystal", Phys. Rev. Letters, 44, 1509–1512, 1980; J. S. Patel et al, "A Reliable Method of Alignment for Smectic Liquid Crystals", Ferroelectrics, 59, 137–144, 1984; J. Cognard, "Alignment of Nematic Liquid Crystals and Their Mixtures", Mol. Cryst. Liq. Cryst.: Suppl., 1982; incorporated herein by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of 4-nitrobiphenyloxyhexyloxymethyl ethylene glycol.

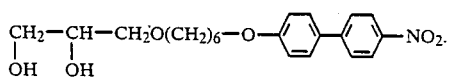

A.

4-(6-Hydroxyhexyloxy)-4'-nitrobiphenyl

To 500 ml of toluene in a one liter round bottom flask, fitted with a condenser and magnetic stirrer, are added 7.6 g (0.03M) of the potassium salt of 4-hydroxy-4'-nitrobiphenyl, 4.9 g (0.035M) of 6-iodo-1-hexanol, and 0.5 g of 18-crown-6ether. The mixture is refluxed for about 20 hours until all of the potassium salt has dissolved and reacted as evidenced by the absence of the blue crystalline solid. The solution is filtered hot, and then cooled to room temperature. After solvent removal, the solid residue is recrystallized from ethanol to yield a purified product, m.p. 117°–119° C.

B.

2,2-Dimethyl-4-bromomethyl-1,3-dioxolane

An acetone solution of bromomethyl ethylene glycol is refluxed for 24 hours in the presence of anhydrous magnesium sulfate. The cooled reaction mixture is filtered and the solvent is removed to provide a residual crude product.

C.

2,2-Dimethyl-4-[6-(4-nitrobiphenyloxyhexyloxymethyl]-1,3-dioxolane

To a one liter round bottom flask, fitted with a condenser and magnetic stirrer, are added 10.6 g (0.03M) of the potassium salt of 4-(6-hydroxyhexyloxy)-4'-nitrobiphenyl, 5.85 g (0.03M) of 2,2-dimethyl-4-bromomethyl-1,3-dioxolane, and 0.5 g of 18-crown-6 ether. The reaction mixture is refluxed for 10 hours, and then filtered while hot. The solvent is removed to provide a residual crude product.

D.

4-Nitrobiphenyloxyhexyloxymethyl ethylene glycol

The crude product of procedure C is heated for 5 hours in an aqueous methanol solution containing a trace of hydrochloric acid. The reaction mixture is filtered, the solvent medium is removed, and the resultant residual solid is recrystallized from ethanol to yield a purified product.

EXAMPLE II

This Example illustrates the preparation of 4-nitrostilbeneoxyhexyloxymethyl ethylene glycol.

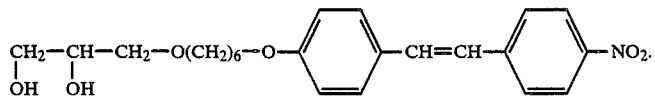

A.

4-(6-Hydroxyhexyloxy)-4'-nitrostilbene

Employing the procedure of Example I(A), 14 g (0.05M) of the potassium salt of 4-hydroxy-4'-nitrostilbene and 14 g (0.06M) of 6-iodo-1-hexanol are reacted. The resultant product is recrystallized from toluene, m.p. 154°–157° C.

B.

2,2-Dimethyl-4-[6-(4-nitrostilbeneoxyhexyloxymethyl)]-1,3-dioxolane

A 11.4 g (0.03M) quantity of the potassium salt of 4-(6-hydroxyhexyloxy)-4'-nitrostilbene and 5.85 g (0.03M) of 2,2-dimethyl-4-bromomethyl-1,3-dioxolane are reacted in accordance with the procedure of Example I(C), and a residual crude product is recovered.

C.

4-Nitrostilbeneoxyhexyloxymethyl ethylene glycol

Following the procedure of Example I(D), 2,2-dimethyl-4-[6-(4-nitrostilbeneoxyhexyloxymethyl)]-1,3-dioxolane is hydrolyzed, and a residual crude product is recovered and recrystallized from ethanol to yield a purified product.

EXAMPLE III

This Example illustrates the preparation of poly[(4-nitrobiphenyloxyhexyloxymethyl)ethylene terephthalate].

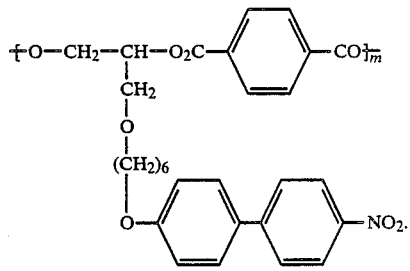

A.

Melt Condensation

To a 300 ml three necked flask, fitted with an argon inlet, mechanical stirrer, and distillation head/condenser, is added 97 g (0.5M) of dimethyl terephthalate, 194.5 g (0.5M) of 4-nitrobiphenyloxyhexyloxymethyl ethylene glycol, 0.14 g of zinc acetate, and 0.03 g of antimony trioxide. The system is evacuated, and then purged three times with argon. The reaction mixture is heated at 160° C./30 minutes, 180° C./60 minutes, 200° C./60 minutes, and 220° C./30 minutes, during which time methanol is distilled off.

The temperature is then raised to 250° C. Over a 30 minute period the pressure is slowly reduced to 1 mm Hg, and then held at 0.5 mm for approximately 30 minutes. Subsequently, the vacuum is released under argon, and the flask is cooled. The polymer product is ground (liquid nitrogen), and air dried.

B.

Interfacial Condensation

A solution of 19.45 g of 4-nitrobiphenyloxyhexyloxymethyl ethylene glycol and 4 g of sodium hydroxide in 300 ml of water is charged to a high speed blender with 30 ml of 10% aqueous sodium lauryl sulfate. A solution of 10.16 g of terephthaloyl chloride in 150 ml of toluene is added to the operating blender, and stirring is continued for an additional 5 minutes. The mixture is then poured into acetone, and the polymer precipitate is filtered, washed with water, and air dried.

EXAMPLE IV

This Example illustrates the preparation of poly[(4-nitrostilbeneoxyhexyloxymethyl)ethylene terephthalate].

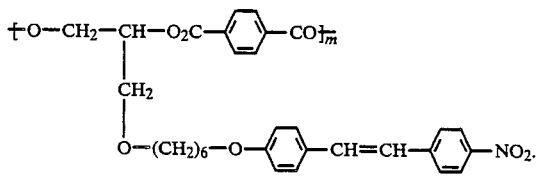

The procedure of Example III(B) is employed, except that terephthaloyl chloride is condensed with 4-nitrostilbeneoxyhexyloxymethyl ethylene glycol to produce the polymer product.

EXAMPLE V

This Example illustrates the preparation of 6-[(4-nitrobiphenyloxy)hexyloxy]terephthaloyl chloride.

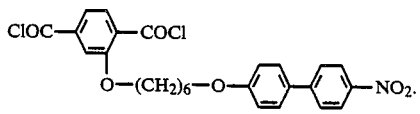

A.

4-(6-Bromohexyloxy)-4'-nitrobiphenyl

To 500 ml of toluene in a 100 ml round bottom flask, fitted with a condenser and magnetic stirrer, are added 7.6 g (0.03M) of the potassium salt of 4-hydroxy-4'-nitrobiphenyl, 36.6 g (0.15M) of 1,6-dibromohexane, and 0.5 g of 18-crown-6 ether. The mixture is refluxed for about 20 hours, and then filtered hot. The solvent is evaporated, and the residual crude product is recrystallized from hexane to provide purified product.

B.

6-[(4-Nitrobiphenyloxy)hexyloxy]terephthalic acid

To 500 ml of toluene in a 1000 ml round bottom flask, fitted with a condenser and magnetic stirrer, are added 7.44 g (0.03M) of potassium dimethyl 2-hydroxyterephthalate, 11.34 g (0.03M) of 4-(6-bromohexyloxy)-4'-nitrobiphenyl, and 0.5 g of 18-crown-6 ether. The reaction mixture is refluxed for about 10 hours, and a crude product is obtained as in Example I(A). The crude product is recrystallized from ethanol to provide a purified diester product.

The diester is refluxed in aqueous ethanol containing an excess of potassium hydroxide. The solvent is removed, and the solution acidified to precipitate the free diacid. The precipitate subsequently is filtered and dried.

C.

6-[(4-Nitrobiphenyloxy)hexyloxy]terephthalic chloride

The 6-[(4-nitrobiphenyloxy)hexyloxy]terephthaloyl acid prepared above is stirred at 40° C. for about 10 hours in toluene with an excess of thionyl chloride. The excess solvent and thionyl chloride are removed in a rotary evaporator, and the residual crude product is dried overnight in a vacuum oven.

EXAMPLE VI

This Example illustrates the preparation of 6-[(4-nitrostilbeneoxy)hexyloxy]terephthaloyl chloride.

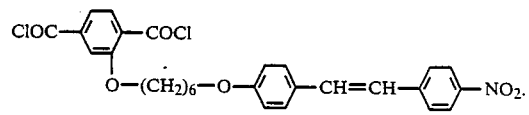

A.

4-(6-Bromohexyloxy)-4'-nitrostilbene

The procedure of Example V(A) is followed, except that 8.4 g of the potassium salt of 4-hydroxy-4'-nitrostilbene is utilized as a reactant. A residual crude product is recovered and recrystallized from hexane to provide a purified product.

B.

6-[(4-Nitrostilbeneoxy)hexyloxy]terephthaloyl dichloride

The procedure of Example V(B) is followed, except that 12.12 g of 4-(6-bromohexyloxy)-4'-nitrostilbene is utilized as a reactant. A residual crude product is recovered and recrystallized from ethanol to provide a purified diester product.

The diester is hydrolyzed with potassium hydroxide in aqueous ethanol by the procedure described in Example V(B) to provide the corresponding free diacid product.

The free diacid is converted to the corresponding dichloride product following the procedure of Example V(C).

EXAMPLE VII

This Example illustrates the preparation of poly(ethylene 6-[(4-nitrobiphenyloxy)hexyloxy]terephthalamide).

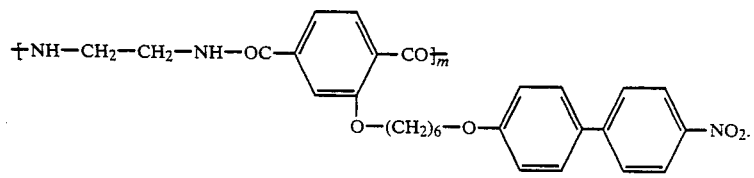

A solution of 3 g (0.05M) of ethylenediamine, 10.6 g (0.1M) of sodium carbonate, and 2 g of sodium lauryl sulfate are dissolved in 300 ml of water in a blender jar. The blending is commenced and a second solution of 25.8 g of 6-[(4-nitrobiphenyloxy)hexyloxy]terephthaloyl chloride in 300 ml of methylene dichloride is added over a period of 5 minutes. Stirring is continued an additional 15 minutes, and subsequently the reaction medium is acidified. Ethanol is added to precipitate the polymer. The polymer is filtered, washed with water, and dried.

EXAMPLE VIII

This Example illustrates the preparation of poly(ethylene 6-[(4-nitrostilbeneoxy)hexyloxy]terephthalamide.

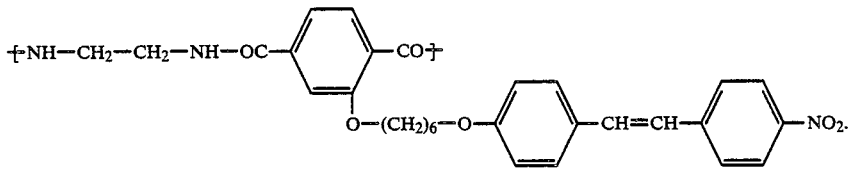

The procedure of Example VII is employed, except that ethylenediamine is condensed with 6-[(4-nitrostilbeneoxy)hexyloxy]terephthaloyl chloride to produce the polymer product.

What is claimed is:

1. A thermotropic liquid crystalline polymer which is characterized by a recurring monomeric unit corresponding to the formula:

$$\begin{array}{c}+P+\\|\\S\\|\\M\end{array}$$

where P is a condensation polymer main chain unit, S is a flexible spacer group having a linear chain length of between about 0–20 atoms, M is a pendant mesogen which exhibits a second order nonlinear optical susceptibility $\beta$ of at least about $5 \times 10^{-30}$ esu as measured at 1.91 $\mu$m excitation wavelength, and where the pendant mesogens comprise at least about 10 weight percent of the polymer, and the polymer has a glass transition temperature above about 40° C.

2. A liquid crystalline polymer in accordance with claim 1 wherein the main chain is a polyester structure.

3. A liquid crystalline polymer in accordance with claim 1 wherein the main chain is a polyamide structure.

4. A transparent nonlinear optical medium comprising a liquid crystalline polymer in accordance with claim 1.

5. A nonlinear optical medium in accordance with claim 4 in which the polymer is characterized by an external field-induced orientation of aligned pendant mesogens.

6. A polymer which is characterized by a recurring monomeric unit corresponding to the formula:

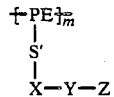

where PE is a main chain polyester condensation unit; m is an integer of at least 3; S' is a flexible spacer group having a linear chain length of between about 1–25 atoms; X is —NR—, —O— or —S—; R is hydrogen or a $C_1$-$C_4$ alkyl group; Y is

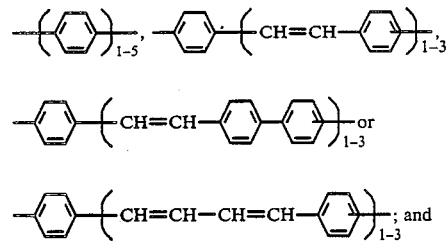

Z is an electron-donating group or an electron-withdrawing group wherein the pendant Mesogen group X-Y-Z exhibits a second order nonlinerar optical susceptibility B of at least about $5 \times 10^{-30}$ esu as measured at 1.01 $\mu$m excitation wavelength, and where the pendant mesogens comprise at least about 10 weight percent of the polymer, and the polymer has a glass transition temperature above about 40° C.

7. A polymer in accordance with claim 6 wherein X is —NR—.

8. A polymer in accordance with claim 6 wherein X is —O—.

9. A polymer in accordance with claim 6 wherein X is —S—.

10. A polymer in accordance with claim 6 wherein Z is an electron-donating group.

11. A polymer in accordance with claim 6 wherein Z is an electron-withdrawing group.

12. A polymer which is characterized by a recurring monomeric unit corresponding to the formula:

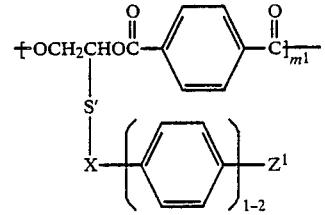

where $m^1$ is an integer of at least 5; S' is a flexible spacer group having a linear chain length of between about 1–25 atoms; X is —NR—, —O— or —S—; R is hydrogen or a $C_1$-$C_4$ alkyl group; and $Z^1$ is —$NO_2$, —CN or —$CF_3$ wherein the pendant mesogen group

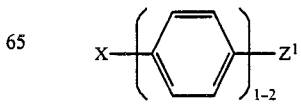

exhibits a second order nonlinear optical susceptibility B of at least about $5 \times 10^{-30}$ esu as measured at 1.91 μm excitation wavelength, and where the pendant mesogens comprise at least about 10 weight percent of the polymer, and the polymer has glass transition temperature above about 40° C.

13. A polymer which is characterized by a recurring monomeric unit corresponding to the formula:

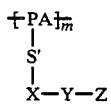

where PA is a main chain polyamide condensation unit; m is an integer of at least 3; S' is a flexible spacer group having a linear chain length of between about 1-25 atoms; X is —NR—, —O— or —S—; R is hydrogen or a $C_1$-$C_4$ alkyl group; Y is

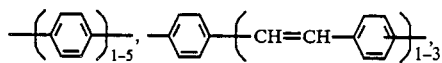

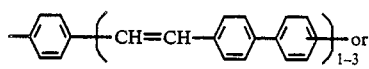

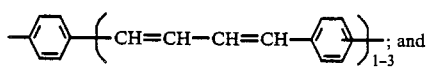

Z is an electron-donating group or an electron-withdrawing group wherein the pendant Mesogen group X-Y-Z exhibits a second order nonlinerar optical susceptibility B of at least about $5 \times 10^{-30}$ esu as measured at 1.01 μm excitation wavelength, and where the pendant mesogens comprise at least about 10 weight percent of the polymer, and the polymer has a glass transition temperature above above 40° C.

14. A polymer in accordance with claim 13 wherein X is —NR—.

15. A polymer in accordance with claim 13 wherein X is —O—.

16. A polymer in accordance with claim 13 wherein X is —S—.

17. A polymer in accordance with claim 13 wherein Z is an electron-donating group.

18. A polymer in accordance with claim 13 wherein Z is an electron-withdrawing group.

19. A polymer which is characterized by a recurring monomeric unit corresponding to the formula:

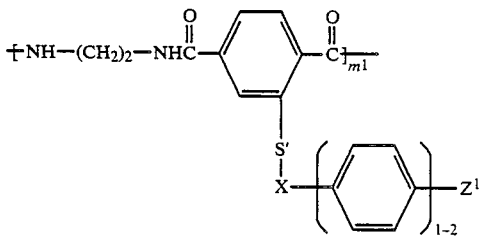

where $m^1$ is an integer of at least 5; S' is a flexible spacer group having a linear chain length of between about 1-25 atoms; X is —NR—, —O— or —S—; R is hydrogen or a $C_1$-$C_4$ alkyl group; and $Z^1$ is —$NO_2$, —CN or —$CF_3$ wherein the pendant mesogen group

exhibits a second order nonlinear optical susceptibility B of at least about $5 \times 10^{-30}$ esu as measured at 1.91 μm excitation wavelength, and where the pendant mesogens comprise at least about 10 weight percent of the polymer, and the polymer has glass transition temperature above about 40° C.

* * * * *